(12) United States Patent
Cresswell et al.

(10) Patent No.: US 10,408,523 B2
(45) Date of Patent: Sep. 10, 2019

(54) COMPONENT MOUNTING IN AN INTEGRATED REFRIGERATED CONTAINER

(71) Applicants: Carrier Corporation, Farmington, CT (US); Kenneth Cresswell, Cazenovia, NY (US); Yu H. Chen, Manlius, NY (US)

(72) Inventors: Kenneth Cresswell, Cazenovia, NY (US); Yu H. Chen, Manlius, NY (US)

(73) Assignee: CARRIER CORPORATION, Farmington, CT (US)

( * ) Notice: Subject to any disclaimer, the term of this patent is extended or adjusted under 35 U.S.C. 154(b) by 485 days.

(21) Appl. No.: 14/366,902

(22) PCT Filed: Dec. 18, 2012

(86) PCT No.: PCT/US2012/070244
§ 371 (c)(1),
(2) Date: Jun. 19, 2014

(87) PCT Pub. No.: WO2013/096247
PCT Pub. Date: Jun. 27, 2013

(65) Prior Publication Data
US 2014/0338374 A1    Nov. 20, 2014

Related U.S. Application Data

(60) Provisional application No. 61/577,848, filed on Dec. 20, 2011.

(51) Int. Cl.
*F25D 11/00* (2006.01)
*F25D 23/00* (2006.01)
(Continued)

(52) U.S. Cl.
CPC ............ *F25D 11/003* (2013.01); *F25D 17/06* (2013.01); *F25D 17/067* (2013.01);
(Continued)

(58) Field of Classification Search
CPC ...... F25D 11/003; F25D 7/067; F25D 17/067; B60H 1/00014
See application file for complete search history.

(56) References Cited

U.S. PATENT DOCUMENTS 2,058,872 A    10/1936  Heideman
2,407,159 A     9/1946  Jones et al.
(Continued)

FOREIGN PATENT DOCUMENTS

CA    2183793 C    8/1996
CN    1261427 A    7/2000
(Continued)

OTHER PUBLICATIONS

Singapore Written Opinion for application SG 11201403317V dated Nov. 17, 2015, 9 pages.
(Continued)

*Primary Examiner* — David J Teitelbaum
(74) *Attorney, Agent, or Firm* — Cantor Colburn LLP

(57) ABSTRACT

A refrigeration system for an interior space (260), includes an evaporator coil (230) and evaporator fan (242) residing within the interior space, the evaporator coil (230) being configured for refrigerating the interior space (260); an evaporator motor (235) coupled to the evaporator fan (242) along an axial shaft; a condenser coil (215) and fan (210) disposed adjacent to the evaporator motor (235); and an insulation panel (250, 255) that separates the evaporator motor (235) from the evaporator fan (242).

7 Claims, 2 Drawing Sheets

(51) Int. Cl.
　　*F25D 17/06*　　(2006.01)
　　*B60H 1/00*　　(2006.01)

(52) U.S. Cl.
　　CPC ........ *F25D 23/006* (2013.01); *B60H 1/00014* (2013.01); *F25D 2317/0681* (2013.01)

(56) References Cited

U.S. PATENT DOCUMENTS

| | | |
|---|---|---|
| 2,630,687 A | 3/1953 | Acton |
| 3,421,340 A | 1/1969 | Berg |
| 4,044,570 A | 8/1977 | Ono et al. |
| 4,182,134 A | 1/1980 | Vegas et al. |
| 4,257,240 A | 3/1981 | Christiansen et al. |
| 4,468,932 A | 9/1984 | Bullard |
| 4,638,641 A | 1/1987 | Taylor |
| 4,736,597 A | 4/1988 | Anderson et al. |
| 4,770,002 A | 9/1988 | Vegas et al. |
| 4,811,569 A | 3/1989 | Welch et al. |
| 5,123,257 A | 6/1992 | Anderson et al. |
| 5,129,235 A | 7/1992 | Renken et al. |
| 5,369,957 A * | 12/1994 | Hanson ................ B60H 1/3225 236/91 F |
| 6,543,244 B1 | 4/2003 | Amr |
| 6,763,677 B1 * | 7/2004 | Burchill .................. F24F 13/12 62/129 |
| 6,945,071 B1 | 9/2005 | Simeone et al. |
| 2011/0011115 A1 | 1/2011 | Bushnell |

FOREIGN PATENT DOCUMENTS

| | | |
|---|---|---|
| CN | 101396213 A | 4/2009 |
| CN | 102159411 A | 8/2011 |
| DE | 7337184 U | 4/1978 |
| EP | 0588634 A1 | 3/1994 |
| EP | 2042059 A1 | 4/2009 |
| FR | 2610708 A1 | 8/1988 |
| WO | 2011050157 A2 | 4/2011 |

OTHER PUBLICATIONS

International Search Report for application PCT/US2012/070244, dated Jun. 25, 2013, 5 pages.
Written Opinion for application PCT/US2012/070244, dated Jun. 25, 2013, 4 pages.
Chinese First Office Action for application CN 201280063357.3 dated Jul. 3, 2015, 7 pages.
European Office Action for application EP 12810506.1, dated Jul. 24, 2018, 23 pages.

* cited by examiner

COMPONENT MOUNTING IN AN INTEGRATED REFRIGERATED CONTAINER

FIELD OF INVENTION

This invention relates generally to a transport refrigeration system and, more particularly, to a integrated refrigerated container having an evaporator motor component, which is thermally separated from its evaporator fan component that is located with a conditioned space being cooled.

DESCRIPTION OF RELATED ART

Products such as produce, meat and the like being shipped relatively long distances are conventionally placed within refrigerated containers. These refrigerated containers are specifically designed for conditioning an interior space with a temperature of the products for an extended period of time. The refrigerated containers utilize a transport refrigeration unit for cooling these products during transport. The refrigeration unit is typically secured to the front wall of the refrigerated container and circulates cooled air inside the interior space through evaporator fans which direct the air from the front of the container to the rear.

BRIEF SUMMARY

According to one aspect of the invention, a refrigeration system for an interior space includes an evaporator coil and an evaporator fan residing within the interior space, the evaporator coil being configured for refrigerating the interior space; an evaporator motor coupled to the evaporator fan along an axial shaft; a condenser coil and a condenser fan disposed adjacent to the evaporator motor; and an insulation panel configured for separating the evaporator motor from the evaporator fan.

According to another aspect of the invention, a method for refrigerating an interior space having a compressor coupled to a condenser coil and an evaporator coil includes providing an evaporator coil and evaporator fan within the interior space, the evaporator coil being configured for refrigerating the interior space; coupling an evaporator motor to the evaporator fan along an axial shaft; providing a condenser coil and a condenser fan adjacent to the evaporator motor; and separating, via an insulation panel, the evaporator motor from the evaporator fan.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the FIGURES.

DETAILED DESCRIPTION

Embodiments of an integrated refrigerated container include a refrigeration system coupled to a cargo container for providing more efficient cooling of an interior space in the cargo container. The integrated refrigerated container includes an evaporator fan component that is located within the interior space being cooled while its motor is located with a cavity separated from the interior space by a plurality of insulation panels. The evaporator motor drives the evaporator fan via an elongated shaft that partially traverses one of the insulation panels in order to maintain the separation between the motor and the evaporator fan. The insulation panels, which insulate the evaporator motor from the interior space, prevent heat from the motor to be added to the interior space, thereby reducing the cooling capacity needs of the interior space while also providing less power consumption of the refrigeration system.

Figure 1:
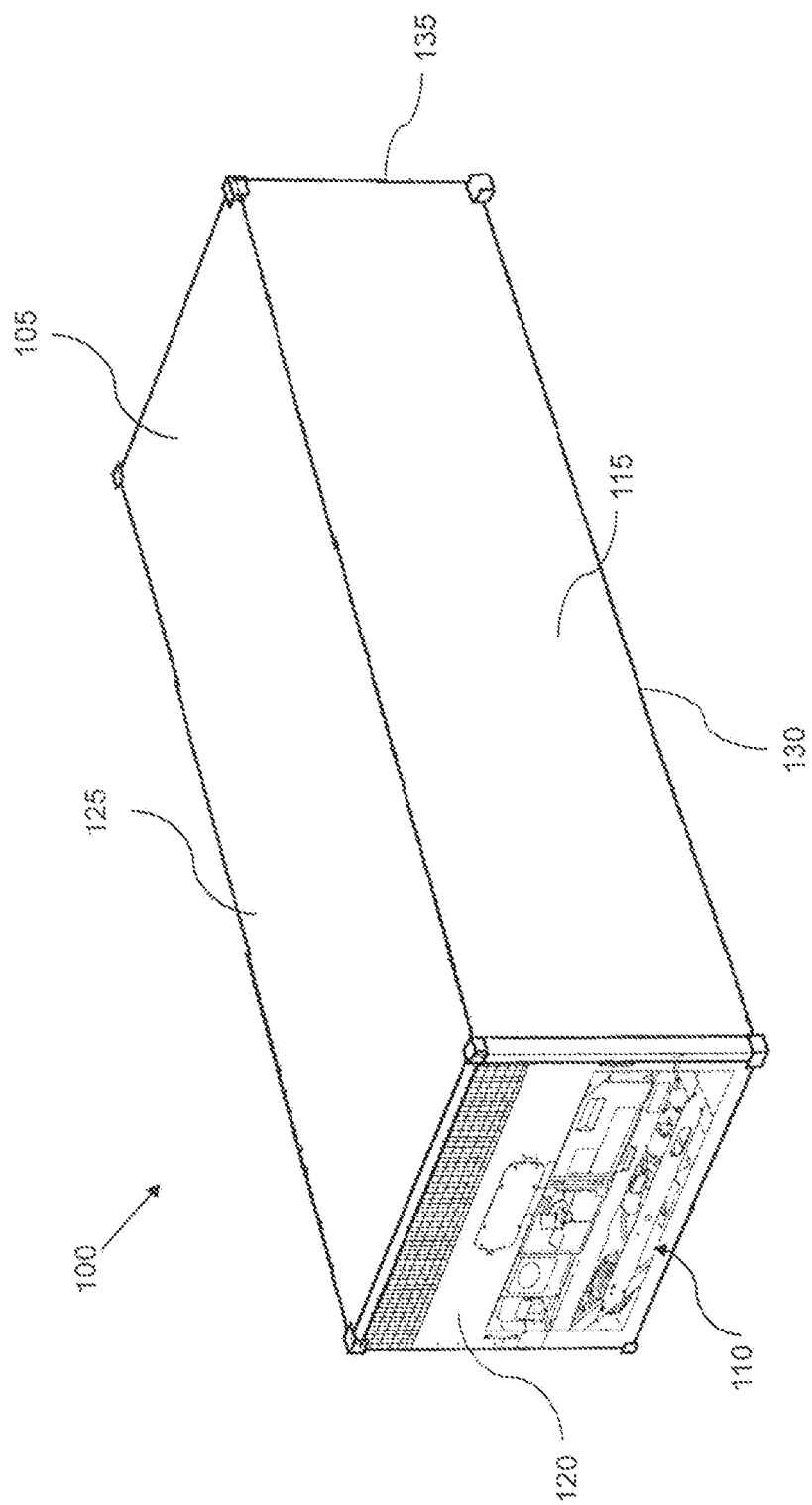
FIG. 1 illustrates a perspective view of an integrated container with a refrigeration system according to an embodiment of the invention.

Referring now to the drawings, FIG. 1 illustrates an example of an integrated refrigerated container 100 including a cargo container 105 coupled to a refrigeration system 110 for providing space cooling of the cargo container 105 according to an embodiment of the invention. The integrated refrigerated container 100, which is shown formed into a generally rectangular construction, and includes opposed side walls 115, a front wall 120, a top wall 125, a directly opposed bottom wall 130, and a door or doors (not shown) attached on hinges at the rear wall 135. The walls 115-130 may be formed from welded corrugated steel or aluminum to provide significant strength and structural integrity. In an example, the integrated refrigerated container 100 may be approximately twenty feet in length and a width and height of approximately eight feet. However, these dimensions may vary depending on the particular environment in which the integrated refrigerated container 100 is utilized. The refrigeration system 110 is integrated into the cargo container 105. The integrated refrigerated container 110 includes a front cavity 200 (FIG. 2) at the front wall 120 for housing components of the refrigeration system 110.

Figure 2:
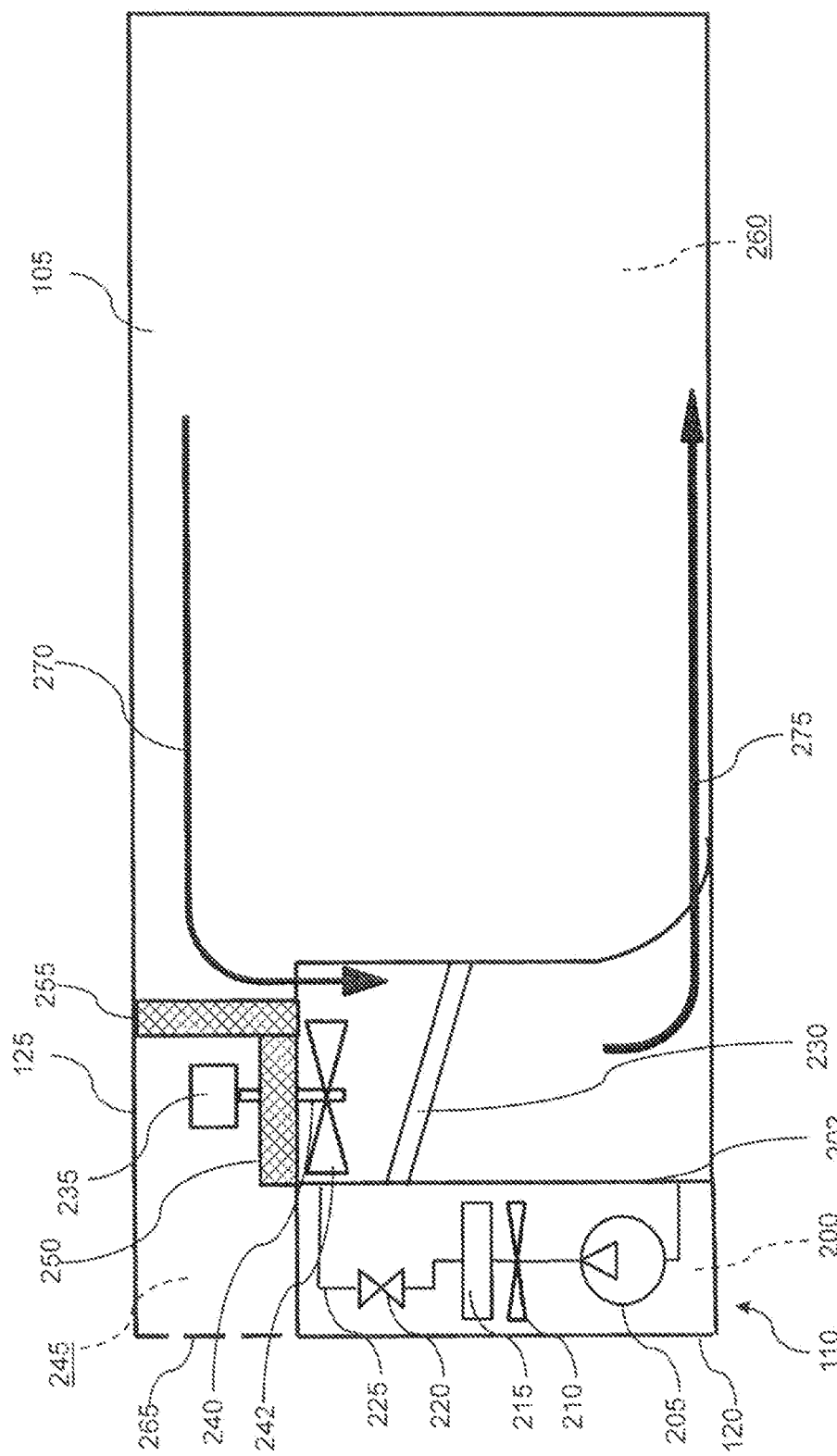
FIG. 2 illustrates a schematic side view of the integrated container with an evaporator motor assembly according to an embodiment of the invention.

Referring to FIG. 2, there is shown a schematic side view of the refrigeration system 110 integrated into the cargo container 105 according to an embodiment of the invention. The refrigeration system 110 includes an electrically driven refrigeration compressor 205 connected, via a refrigerant line 225, to a condenser coil 215, a condenser fan 210, and an expansion valve 210. The compressor 205, condenser coil 215, condenser fan 210, and expansion valve 220 are positioned in the front cavity 200, which is exposed to the external ambient environment. Also, the compressor 205, condenser coil 215, condenser fan 210, and expansion valve 220 are separated from the interior space 260 by an insulating wall 202. An evaporator motor 235 drives a shaft 240, which is connected to an evaporator fan 242 for providing uniform air flow over an evaporator coil 230 along paths 270, 275 in order to cool the interior space 260. The evaporator motor 235 is positioned in a top cavity 245 formed by the top wall 125 and perforated panel 265, which extends from the front wall upwards towards the top wall 125. The evaporator motor 235 generates heat during operation, and the perforated panel 265 allows ambient air to enter and circulate within the cavity 245 and cool the evaporator motor 235 during operation. Further, the evaporator coil 230 and the evaporator fan 242 are located within the interior space 260 and are separated from the top cavity by a plurality of insulating panels 250, 255. It is to be appreciated that the interior space 260, being insulated from the evaporator motor 235 prevents heat from the rotating motor to be added to the interior space 260, thereby reducing the cooling capacity needs of the interior space 260 and providing less power consumption of the refrigeration system 110.

In operation, as shown in FIG. 2, low-pressure refrigerant is delivered to the compressor 205 via the refrigerant line 225, where it is compressed to a high-pressure, high temperature gas. The high-pressure, high temperature gas from the compressor 205 is delivered to the condenser 215 where the ambient air passes across the condenser 215 (e.g., via the condenser fan 210) and condenses the high-pressure vapor refrigerant into a lower temperature refrigerant gas. The refrigerant gas exiting the condenser coil 215 is diverted through the expansion valve 220. The pressure change caused by the expansion valve 220 causes the gaseous refrigerant to liquefy into a super cooled liquid refrigerant. The liquid refrigerant passes through the evaporator coil 230, where the evaporator fan 242 circulates the air from the interior space 260 over the evaporator coil 230 in order to cool it further. The evaporator motor 235, being located outside the interior space 260 and the shaft 240 partly traversing the interior space 260 prevents heat generated by the evaporator motor 235 from being delivered to the interior space 260, thereby providing for a more efficient cooling system. Additionally, the perforated panel 265 provides for ambient air flow over the evaporator motor 235 to cool the evaporator motor 235 during operation, thereby preventing heat from accumulating within the top cavity 245.

The technical effects and benefits of embodiments relate to an integrated refrigerated container having a refrigeration system for providing more efficient cooling. The integrated refrigerated container includes an evaporator fan that is located with an interior space being cooled while an evaporator motor is located within an external cavity separated from the interior space by a plurality of insulation panels. The motor, being isolated from the interior space prevents heat from the motor being added to the interior space, thereby reducing the cooling capacity needs of the interior space and providing less power consumption of the refrigeration system.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for conditioning an interior space of a cargo container including, a front wall opposite a rear, side walls connecting the front wall and the rear, a top wall connecting the front wall and the rear, a bottom wall opposite the top wall, the bottom wall below the top wall, the bottom wall connecting the front wall and the rear, a door hingedly mounted at the rear providing access to the interior space of the cargo container, the system comprising:

a transport refrigeration system configured to be coupled with the cargo container at the front wall of the cargo container, the transport refrigeration system including:

an evaporator coil and an evaporator fan configured to reside within the interior space of the cargo container, the evaporator coil being configured for refrigerating the interior space, the evaporator fan positioned to receive airflow from the interior space along a first path at the top wall and the evaporator coil positioned to direct airflow to the interior space along a second path at the bottom wall;

an evaporator motor coupled to the evaporator fan along an axial shaft, the evaporator motor residing within a first cavity, the first cavity being in fluid communication with an ambient environment external to the cargo container;

a condenser coil and a condenser fan disposed in a second cavity, the second cavity being in fluid communication with the ambient environment external to the cargo container, the first cavity separate from the second cavity;

a first insulation panel that separates the evaporator motor from the evaporator fan, the axial shaft passing through the first insulation panel;

a second insulation panel that separates the interior space from the first cavity;

at least one perforated panel located between the first cavity and the ambient environment, the at least one perforated panel being configured for allowing ambient air to enter the first cavity to cool the evaporator motor, the at least one perforated panel being located above the second cavity, the at least one perforated panel being opposite the rear, the at least one perforated panel being closer to the top wall than the bottom wall.

2. The system of claim 1, wherein the evaporator fan is configured for circulating cooled air within the interior space.

3. The system of claim 1, further comprising a compressor configured for conditioning a refrigerant contained therein.

4. The system of claim 3, further comprising a refrigerant line configured for circulating the refrigerant through the evaporator coil.

5. The system of claim 1, further comprising an insulating wall separating the interior space from the second cavity.

6. The system of claim 1, wherein the first insulation panel is horizontal and the second insulation panel is vertical, the first insulation panel and the second insulation panel contacting each other.

7. The system of claim 1, further comprising a wall separating the first cavity from the second cavity.

* * * * *